United States Patent [19]
Farrah

[11] 3,771,116
[45] Nov. 6, 1973

[54] METHOD AND APPARATUS FOR IMAGING STATIONARY AND MOVING OBJECTS

[75] Inventor: Harry Robert Farrah, Oak Park, Mich.

[73] Assignee: The Bendix Corporation, Southfield, Mich.

[22] Filed: Jan. 12, 1972

[21] Appl. No.: 217,156

[52] U.S. Cl.................. 340/5 H, 73/67.5 H, 343/17
[51] Int. Cl............................................. G01s 9/66
[58] Field of Search....................... 340/5 H; 343/17; 73/67.5 H

[56] References Cited
UNITED STATES PATENTS
3,617,994  11/1971  Glenn, Jr. et al................... 340/5 H Primary Examiner—Richard A. Farley
Attorney—John S. Bell et al.

[57] ABSTRACT

Method and apparatus for imaging both moving and stationary objects in a holographic system that irradiates an object with coherent acoustic energy. In the different disclosed embodiments, the irradiation is generated by an array of acoustic transmitters which are either each driven in a predetermined sequence at a different frequency or simultaneously driven at different frequencies or by a single scanning transmitter which is driven either at a different frequency in each of several selected scanning positions or at a continuously varying frequency. This reflected radiation is detected by a receiver array which develops corresponding electric signals. A processing control provides phase comparison between the detected signals and a reference frequency signal and also filtering to develop an imaging signal corresponding to the amplitude of the receive signal and the phase difference between the two signals. These imaging signals are developed in sets for each discrete frequency and stored until a readout is wanted and then are supplied to a hologram display device to facilitate a reconstruction of the image.

22 Claims, 5 Drawing Figures

PATENTED NOV 6 1973 3,771,116

METHOD AND APPARATUS FOR IMAGING STATIONARY AND MOVING OBJECTS

The invention relates to method and apparatus for imaging both moving and stationary objects.

In practice long wave-length holography is usually limited by the relatively small size of the aperture (measured in wave-lengths) which results in a poor quality image. This limitation is particularly pronounced with the wave-lenghts over 1 millimeter and when the receiver aperture is necessarily limited in size. Then by way of example, assume the receiver aperture is made up of an array of transducers. A square receiver array with a 200 wave-length aperture comprised of transducers spaced one wave-length apart would require 40 thousand transducers. A larger aperture would require correspondingly more transducers. Because each transducer requires associated electronics, the system becomes complex, expensive and difficult to construct. For this reason various ways have been devised to obtain the effect of a large aperture synthetically when viewing stationary objects; e.g. by scanning a single element receiver or a receiver array over a large area, by appropriately scanning a single element transmitter or transmitter array over a large area, by a combination of both, or by using an array of transmitters and an array of receivers. If the object to be imaged moves or if there are other objects moving within the proximity of a stationary or moving object, the problem becomes even more complex. For example, if the object is moving, the holographic recording must be made in a short time interval. If there are multiple objects present, the resultant images can be misleading.

With the foregoing in mind, new and different method and apparatus are contemplated for obtaining increased aperture sizes for developing improved quality holograms of both moving and stationary objects with coherent long-wave length radiation whereby different transmitted frequencies are employed.

Also contemplated are method and apparatus for simulating a large array of receivers for holographically imaging objects. Accordingly, various different apparatus are contemplated wherein an array of transmitters are each operated at a different frequency in a predetermined sequence; wherein an array of transmitters are each simultaneously operated at a different frequency; wherein a single scanning transmitter is operated at a different frequency in each of its different scanning positions; and wherein a single scanning transmitter is operated at a continuously varying frequency during the scan.

Another objective is the provision of method and apparatus for developing holograms of an object when there are multiple objects present in the field of view.

Other objectives include the provision of such method and apparatus for obtaining a large receiver aperture size with a minimum of components whereby acoustic energy is transmitted at different selected frequencies in each of several transmitting positions towards an object to be imaged and thereafter the reflected acoustic energy is detected and processed to obtain imaging information by phase comparing reference frequency signals with the detected signals and filtering to develop corresponding sets of imaging information signals for each frequency and then each set is displayed on a display device in a position corresponding to the transmitting position after read-out from a memory.

The foregoing and other objects and advantages of the invention will become apparent from the following description and from the accompanying drawings, in which.

Figure 1:
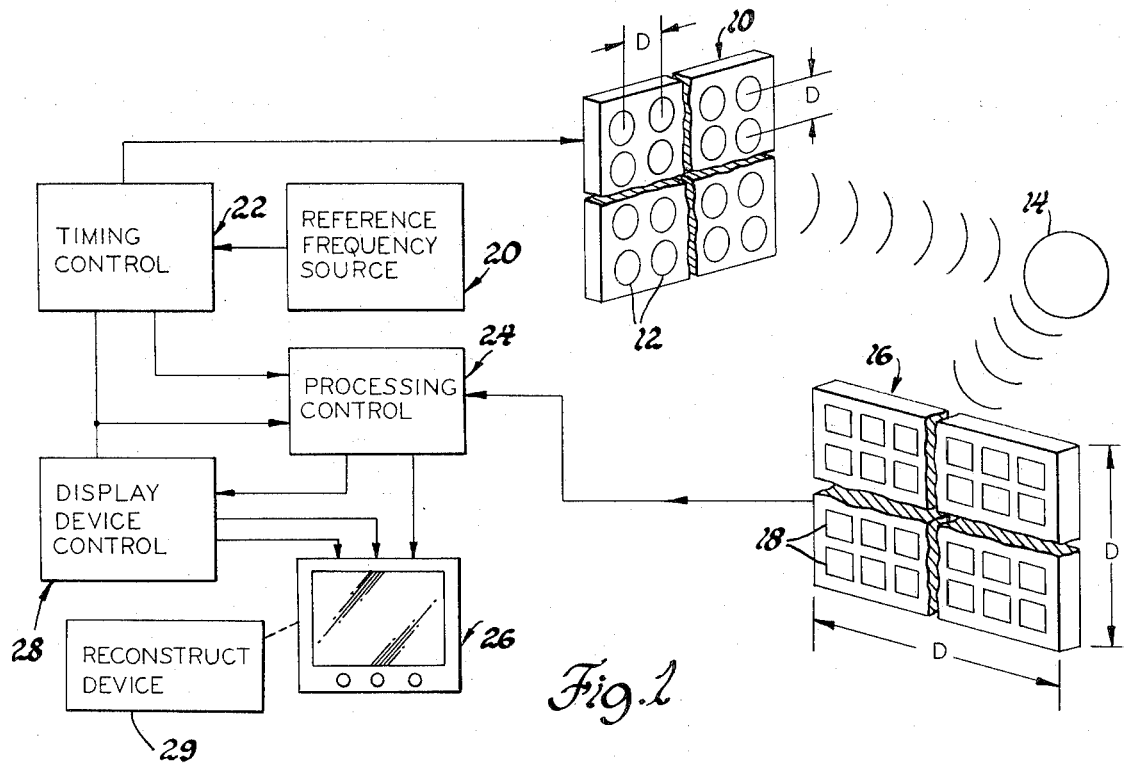
FIG. 1 is a schematic diagram of a holographic system incorporating the principles of the invention.
Figure 4:
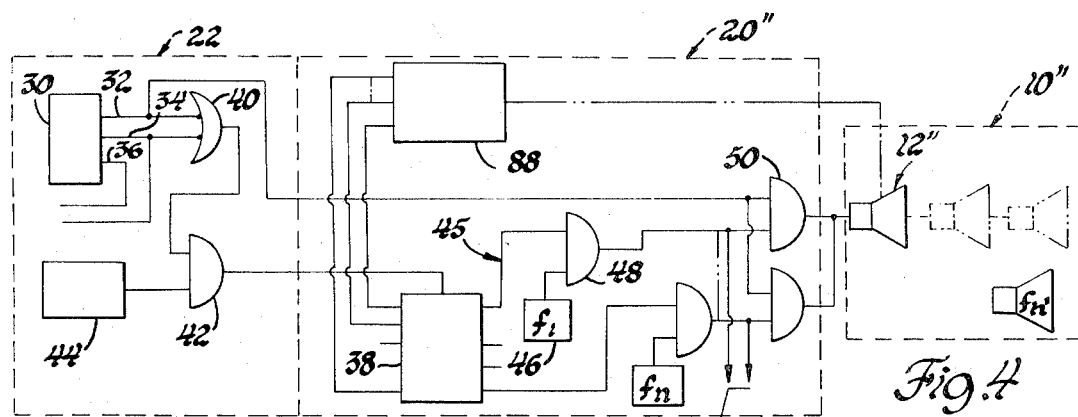
Figure 5:
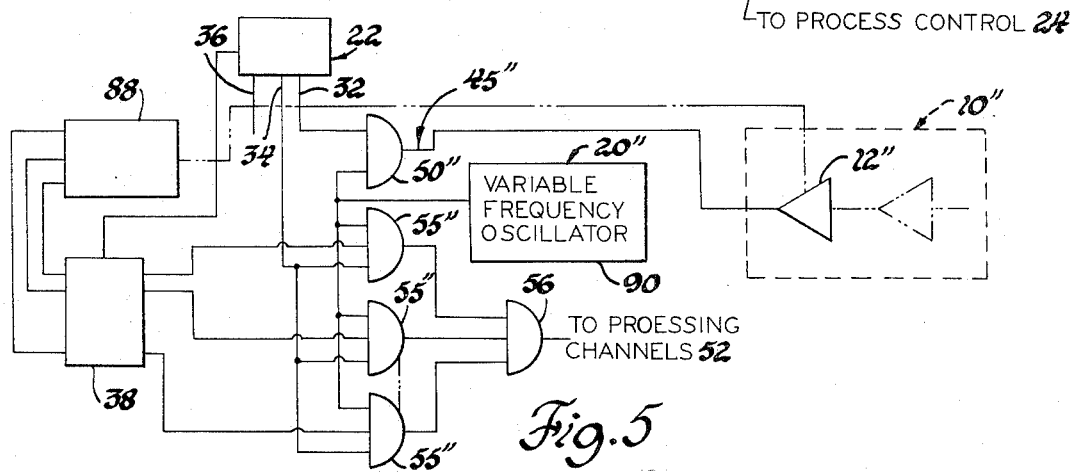
Figure 3:
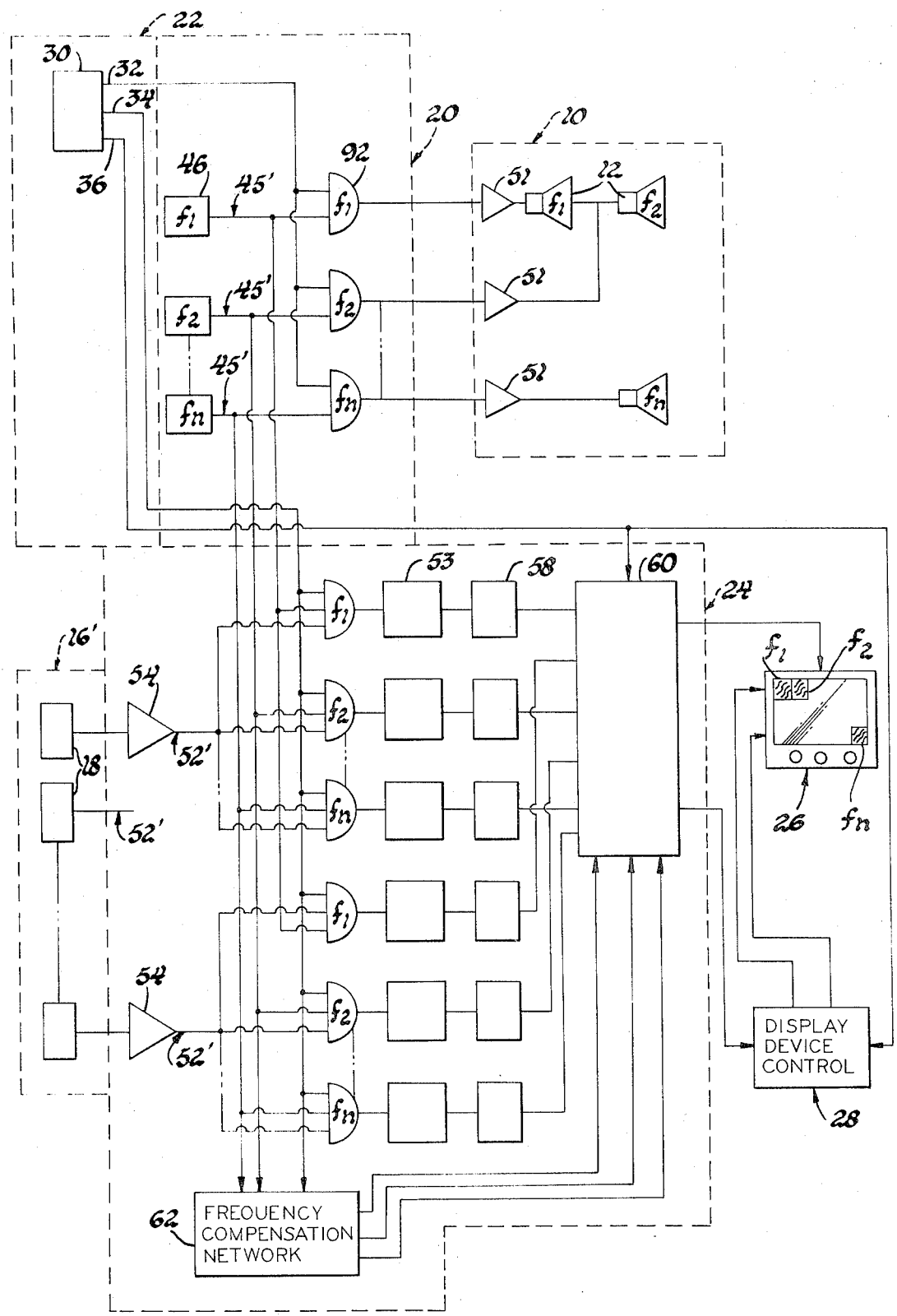

FIG. 3 is a schematic diagram of the circuitry employed in the FIG. 1 system when the array of transmitters are each simultaneously operated at a different frequency; and FIGS. 4 and 5 are partial schematic diagrams of circuitry employed when a single scanning transmitter is respectively operated at a different frequency in each of its scanning positions and is continuously operated at a varying frequency during its scan.

Referring first to FIG. 1, the illustrated holographic system has generally denoted at 10 a transmitter array comprised of a series of transmitters 12 which can be, by way of example, conventional transmitting transducers that supply r-f energy or acoustic energy each at some discrete selected different frequency. For demonstration purposes, it will be assumed that acoustic energy is being transmitted. The number of different frequencies will equal the number of transmitters and will hereinafter be referred to as frequencies $f1$ through $fn$, where $n$ equals the total number of frequencies. The number of frequencies will vary with each different application and this number, in turn, determines the number of components. The drawings have been simplified to avoid duplication by only showing those components for the first frequency $f1$ and the last frequency $fn$. This acoustic energy is used to sequentially irradiate, at these different frequencies, an object 14, which can be either stationary or moving. The acoustic energy reflected from the object 14 is detected by a receiver array shown generally at 16. This receiver array 16 comprises a series of individual receivers or transducers 18, which may be piezo-electric transducers or any other commercially available transducer capable of converting the detected acoustic energy to corresponding detected electric signals. For demonstration purposes the receiver array 16 is shown as square with any selected aperture size "D." Accordingly, the spacing of the transmitters 12 relative to each other are at this same dimension "D." The individual transmitters 12 in the transmitter array 10 are each driven at a separate one of the frequencies $f1$ through $fn$ by a reference frequency source denoted generally by the numeral 20 and in a timed sequence determined by a timing control 22. This same timing control 22 time relates the reception of the reflected acoustic energy by the receiver array 16 so that at the proper time a processing control 24 phase compares the detected signals with the reference frequency signals from the reference frequency source 20 and then filters the result to obtain the imaging information in the form of sets of imaging signals, one set for each frequency $f1$ through $fn$. These sets of signals are stored until a read-out is wanted when they are delivered to a display device 26. The display device 26 may be any suitable type of electrooptic display device having $x$ and $y$ plane deflection or positioning devices and a control grid or other means for controlling the display intensity. For example, a cathode ray tube can be employed. To operate the display device 26, an appropriate display device control 28 is utilized to provide the x and y scan signals in synchronism with the read-out, and to supply the sets of imaging signals to the control grid so as to develop the hologram. Reconstruction of the composite hologram is done in the usual way with a reconstruction device 29, which includes a conventional laser and optics to obtain the reconstructed image of the object 14.

A system of the FIG. 1 type, as so far described but having only a single frequency transmitter, is disclosed in the U.S. Pat. No. 3,717,843 to Mueller et al. and entitled "A holographic system for forming images of both stationary and moving objects."

Considering first the timing control 22, the function as explained is to time-relate the transmission of the acoustic energy, its reception, and finally its read-out to the display device 26. For this purpose, the timing control 22 employs an automatic timer 30, which an be a stepping switch, an appropriately programmed computer, or any other suitable interval timer. If preferred, the timer 30 can be manually operated. The timer 30 has outputs 32, 34, 36 which respectively provide transmit command signals. Because in the FIG. 2 embodiment, the transmitters 12 in the transmitter array 10 are each to be driven sequentially at a different frequency and also because these same frequencies are used as a reference, a serial to parallel counter, which may be a ring counter and which is shown generally at 38 is employed by the timing control 22. This ring counter 38 provides actuating signals at its output in the sequence selected for operating the transmitters 12 in the transmitter array 10. To initiate operation of the ring counter 38 either a transmitter command signal or a receive command signal is supplied by the timer 30 to one of the inputs of an OR gate 40. The output developed by the OR gate 40, is then supplied to one of the inputs of an AND gate 42. A suitable pulse generator 44 has its output connected to the other input of the AND gate 42 and supplies thereto rectangular shaped pulses so that corresponding output time-spaced pulses from the AND gate 42 will be developed. These time-spaced pulses operate the ring counter 38 so that it will provide individual actuating signals with the proper elapsed time therebetween to successively activate the individual transmitters 12 in the selected sequence.

To utilize these actuating signals from the timing control 22 for operating the transmitter array 10 in this same timed sequence, the reference frequency source 20 has a series of transmitter drive channels 45 which provide drive to the transmitter array 10. The number of the channels 45 corresponds to the number of frequencies $f1$ through $fn$ and this number is determined by the number of transmitters 12 in the transmitter array 10. Each channel 45 is identical functionally and has an oscillator 46 which provides one of the frequencies $f1$ through $fn$. The output of the oscillator 46 is connected to the input of an AND gate 48 and if the actuating signal from the ring counter 38 is supplied to the other input of the AND gate 48 at the same time, there will be an output from the AND gate 48 supplied to one of the inputs of another AND gate 50. The other input to the AND gate 50 is connected to the transmit command signal output 32 of the timer 30 and if there is a transmit command signal present, an output driving signal at one of the frequencies $f1$ through $fn$ assigned to that channel 45 will be supplied to the corresponding transmitter 12 and drive it at this frequency. If amplification is needed a power amplifier 51 can be included. Each of the other transmitters 12 are sequentially driven at their respective frequency as these actuating signals are supplied successively to each of the transmitter drive channels 45, provided there is a transmit command signal present at the other input of the AND gate 50.

The process control 24 functions to derive from the reflected acoustic energy detected by the receiver array 16, the imaging information required to produce the hologram. As is well known in the art, the reference acoustic energy required to form the hologram can be supplied electronically after the acoustic energy is detected. Of course, a series of transmitters could be employed to project reference acoustic energy to the receiver array 16. This latter approach involves practical problems as is well understood by those skilled in the art.

The process control 24 is generally similar to that disclosed in the aforementioned application and reference can be made to this application for the details. Briefly and for purposes of understanding this invention, the process control 24 has a series of processing channels 52, one for each receiver 18. To obtain the reference frequency signal for each processing channel 52, a series of AND gates 55, one for each discrete frequency $f1$ through $fn$ is employed. Since the same frequencies employed in driving the transmitters 12 must for reference purposes be used, one of the inputs to the AND gates 55, is connected to the output of the AND gate 48 in the corresponding frequency transmitter drive channel 45 of the reference frequency source 20. The other inputs of the AND gates 55 are connected to the receive command signal output 34 of the timer 30 in the timing control 22. The output of the AND gates 55 are in turn connected to the input of an OR gate 56 which provides the reference frequency signals to each of the processing channels 52 in the sequency established by the reference frequency source's ring counter 38. Each channel 52 includes a phase detector 53, which can be any one of several well-known synchronous full-wave detectors such as a field effect transistor. The phase detector 53 has one of its inputs connected to its associated receiver 18, through a preamplifier stage 54, which is for signal gain and impedance matching purposes, if needed, and the other receives the reference frequency signal.

Thus, when a receive command signal is received at the one input of the AND gate 55; by way of example, the gate for the $f1$ frequency simultaneously with the $f1$ reference frequency signal from the respective AND gate 48 in the reference frequency source 20, the OR gate 56 will deliver the reference frequency signal at the frequency $f1$ to all of the processing channels 52. Each channels' phase detector 53 will phase compare the detected signals from its receiver 18 with this reference frequency signal and develop an output, which is supplied to a filter and memory device denoted by the numeral 58. The filter and memory device 58 can be in different forms. By way of suggestion, an integrating circuit can be utilized to serve as a narrow band pass filter, which will only pass the transmitted frequency at that time, and also to store the resultant imaging signal. In this way each processing channel 52 develops iimaging information in the form of an imaging signal which equals the product of the amplitude of the detected signal and the cosine of the difference between the phase angles of the detected signal and the reference frequency signal. With each processing channel 52 developing a separate imaging signal corresponding to the spatial location its receiver 18 has in the receiver array 16, the channels 52 will all combine to provide a set of imaging signals for each frequency $f1$ through $fn$.

To remove the sets of imaging signals from the processing channels 52, a suitable read-out device shown generally at 60 is employed. This read-out device 50 can be of any known type, such as that disclosed in the aforementioned application and functions to remove the stored imaging signal from each processing channel's filter and memory device 58 simultaneously or in some desired sequence and deliver these sets of imaging signals to the control grid of the display device 26. This read-out is initiated upon receipt by the read-out device 60 of a read-out command signal from the output 36 of the timer 30 in the timing control 22.

Because each frequency utilized is different, each set of imaging signals must be magnified or demagnified so that each set of imaging signals supplied to the display device 26 will have the same size relationship to accurately reproduce the hologram fringes. This is necessary since the magnification of the reconstructed image is proportional to the acoustic frequency used and each portion of the hologram must have the same magnification. For this purpose, a frequency compensation network shown generally at 62 is incorporated in the process control 24. This frequency compensation network 62 includes a series of frequency compensation channels 64, one for each frequency $f1$ through $fn$. Each channel 64 performs the same function and includes an integrator 66 and a calibrating resistance 68. Each integrator 66 has its input connected to one of the outputs of the ring counter 38 and receives the actuating signals therefrom both during the transmit and receive cycles. The resistances 68 and the integrators 66 are calibrated so as to develop from these actuating signals the required frequency compensation voltages. These voltages from the different integrators 66 are then stored by a memory 70 until read-out during the read-out cycle when they are fed to the display device control 28.

The display device control 28 operates in a well known way to provide $x$ and $y$ axis scan signals to the display device 26 and utilizes the voltages from the frequency compensation network 62 to make the scan adjustments for the different frequencies so that all of the fringes, representing the imaging information from each imaging signal, are all of the mentioned correct size and displayed in the proper position in the display device 26. In the display device control 28, a conventional scan generator 72 is employed to develop at each of its outputs 74 and 76 $x$ and $y$ axis scan signals, which are respectively increased in strength in variable gain amplifiers 78 and 80. This gain is adjusted by the frequency compensation voltage received from the frequency compensation networks memory 70 by way of the read-out device 60 and another amplifier 82. These $x$ and $y$ axis scan signals, are next respectively supplied to the inputs of summing amplifiers 84 and 86 along with the frequency compensating signals received directly from the read-out device 60. The signals from the read-out device 60 that are supplied to the inputs of summing amplifiers 84 and 86 provide an offset voltage to the display device 26 so that the start of each frame ($X = O; Y = O$) will be correctly positioned. For example, the image information corresponding to $f1$ is displayed in the upper left hand corner, the image information corresponding to $f2$ is displayed next to the $f1$ information and the image information corresponding to $fn$ is displayed in the lower right hand corner of the display device 26. The resultant outputs from the summing amplifiers 84 and 86 then supply correctly positioned frequency compensated $x$ and $y$ axis scan signals to the usual scanning devices in the display device 28.

Figure 2:
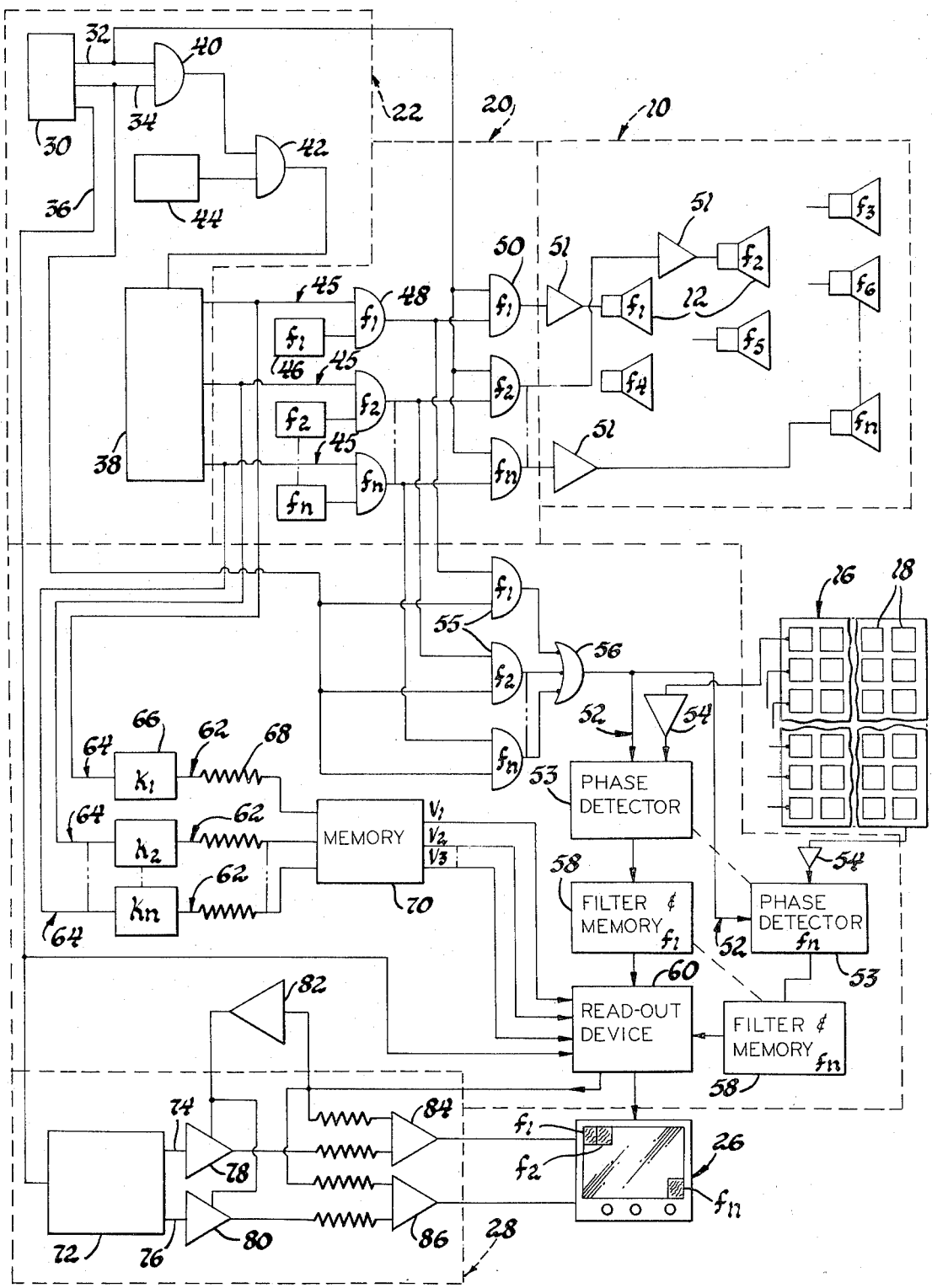
FIG. 2 is a schematic diagram of circuitry employed in the FIG. 1 system when each of an array of transmitters are sequentially operated at a different frequency.

In summarizing the operation of the FIG. 2 embodiment, it will be assumed that the object 14 in FIG. 1 is moving. Therefore, and as explained in the aforementioned application, the depth of the scene to be viewed must be considered along with the approximate speed at which the object 14 is moving. A further consideration with this FIG. 2 embodiment is whether there are any moving objects between the transmitter array 10 and the principal object 14. The latter is a concern because objects that move in the proximity of the principal object 14 could give erratic results. For instance, the energy received from secondary objects might appear similar to the energy received from the principal object 14 at a given time.

With these considerations in mind, the timing control 22 and the processing control 24 are adjusted accordingly. For example, the depth of the scene of the image is determined by the length of time allowed for the radiation generated by the transmitter array 10 to be reflected from the object 14 and detected by the receiver array 16. The timing control 22 is therefore adjusted so that the time interval for the transmit and receive cycles will preclude the pprocessing of reflected radiation occurring before the receiver array 16 starts detecting; e.g., from objects in the foreground. This time interval for transmitting and receiving establishes the range of the scene. Also, this time interval with moving objects must be necessarily short to avoid degrading the quality of the hologram. If the principal object is stationary, this time interval can be longer. It is important to note that with the transmitters 12 each being driven at a different selected frequency, the multiple object problem is avoided because frequency components representing unwanted objects are either not received during the receive cycle or are filtered from the imaging information signal.

To initiate operation of the FIG. 2 embodiment, the timing control 22 is started so that the timer 30 initiates the transmit cycle by supplying a transmit command signal at its output 32 which through the OR gate 40 and the AND gate 42 starts the ring counter 38 to provide a sequence of actuating signals at the operating frequency of the pulse generator 44. This same transmit command signal is supplied to the AND gate 50 to activate all of the transmitter drive channels 45 and the oscillators 46 to supply driving power to the respective transmitters 12 for time intervals adequate to give the correct depth of field in the received image.

Next, the timer 30 turns off the transmit command signals and, after a time interval corresponding to the range of the object, commences the receive cycle by providing the receiving command signals at its output 34. These receive command signals are supplied to the AND gates 55 in the processing control 24 and also activate the OR gate 40 and the AND gate 42 in the timer control 30 to cause the ring counter 38 to continue to provide actuating signals again at the operating frequency of the pulse generator 44. Since there is no transmit command signal delivered to the AND gates 50 in the reference frequency source 20, the transmitter array 10 receives no driving power and there is no further transmission of acoustic energy. However, the ring counter 38 does continue to sequentially provide actuating signals to the transmitter drive channels 45 so that the AND gates 48 are activated to supply their outputs, which are the reference frequency signals, in the same sequence as the actuating signals, to the processing control 24.

In the processing control 24, these reference frequency signals as they occur activate the AND gates 55 so that the OR gate 56 will in the same sequence provide the reference frequency signals to each of the processing channels 52 and specifically to the inputs of each of the phase detectors 53. Each of these phase detectors 53 then combine with the filter and memory devices 58 to develop and store sets of imaging signals for each frequency $f1$ through $fn$. These transmit and receive cycles are repeated for each transmitter 12 and its frequency of total of $n$ number of times.

At the time that this detection of the reflected acoustic energy is taking place, the frequency compensation network 62 is operative to develop the frequency compensation voltage for each frequency. These voltages are stored in the memory 70 to await the read-out cycle.

The read-out cycle is also commenced by the timer 30 which provides a read-out signal at its output 36 that is supplied both to the read-out device 60 and the display device control 28. The read-out device 60 is activated by the read-out signal and commences to successively receive the sets of imaging signals starting with the set of imaging signals for frequency $f1$ and simultaneously remove the corresponding frequency compensation voltage for this frequency $f1$ from the memory so that the imaging information will appear on the display device 26 as shown in FIG. 2 with the information corresponding to the set of imaging signals for frequency $f1$, $f2$ and $fn$ being successively displayed respectively by the blocks $f1$, $f2$ through $fn$.

The number of these blocks $f1$ through $fn$ equals the number of frequencies and of course the number of transmitters 12. Each block displays the imaging information in the same position on the display device 26 as its transmitter 12, has in the array 10. For example, the block $f1$ displays the $f1$ imaging information from the $f1$ transmitter 12 and so forth. As can be appreciated, this results in a transmitter aperture size that is increased $n$ times in size. Also, the receiver array 16 is reused this many times. Consequently, a large size hologram is obtained with a relatively small receiver array. Otherwise, the receiver array 16 would require $n$ times more receivers 18 to obtain this same size hologram.

Reconstruction of the imaging information thereafter is done in the aforementioned way by the reconstruction device 29 to obtain the reconstructed image of the object 14.

Referring next to FIG. 3, this embodiment simultaneously drives each of the transmitters 12 in the transmitter array 10 at a different frequency. For purposes of simplification, the same numerals as used in the FIG. 2 embodiment designate like parts, except those parts that are similar include a prime (') to their number. To develop the simultaneous operation, the timing control 22 employs a series of transmitter drive channels 45' for providing the selected number of frequencies, which again will be identified as frequencies $f1$ through $fn$ and will equal the number of transmitters 12 used in the transmitter array 10. Each channel 45' includes an oscillator 46 and an AND gate 92. The AND gate 92 has one of its inputs connected to its oscillator 46 and the other to the transmit command signal output 32 of the timer 30. When the timer 30 provides the transmit command signal, all of the transmitter drive channels 45' are simultaneously energized to drive its associated transmitter 12 at its respective frequency. This initiates the transmit cycle.

The time interval between the transmit cycle and the receive cycle is selected in the same way as in FIG. 2 embodiment. Therefore, the timer 30 ceases providing the transmit command signals and, after the selected time interval, commences to provide the receive command signals to the processing control 24'. The reflected energy received by the receiver array 16 is detected by the individual receivers 18 and then transferred to the respective processing channels 52' for each receiver 18. The detected energy in each channel 52' is transferred through the pre-amplifier 54 to a series of AND gates 94 corresponding in number to the number of transmitted frequencies $f1$ through $fn$. Each AND gate 94 has supplied to its three inputs the detected signal, the receive command signal from the timer 30, and a reference frequency signal from its associated oscillator 46. Thus, each channel 52' has the same number of AND gates 94 as there are transmitters 12.

The outputs from each of the AND gates 94 are processed in the same way as in the FIG. 2 embodiment, i.e. they are each phase compared by the phase detectors 53 then filtered and stored in a filter and memory device 58. Consequently, during this receive cycle each processing channel 52' simultaneously develops its set of imaging signals for each frequency, whereas in the FIG. 2 embodiment, the sets of imaging signals were developed sequentially. As before, there are available for read-out a set of imaging signals for each frequency $f1$ through $fn$.

Because of these different frequencies, frequency compensation is still necessary in this FIG. 3 embodiment. The same frequency compensation network 62 as described before is utilized and these compensating voltages for each discrete frequency are stored until a read-out is desired.

The read-out cycle is accomplished in the same way as in the FIG. 2 embodiment. When a read-out is desired, the read-out device 60 is activated by a read-out command signal from the timer 30 so that the sets of imaging signals for each frequency from each of the processing channels 52', and the frequency compensation voltage for the corresponding frequency are successively transferred, starting frequency $f1$, respectively to the display device control 28 and the display device 26. As before the imaging information will be displayed by the blocks $f1$, $f2$ through $fn$ on the screen of the display device 26.

In FIG. 4, a modification of the FIG. 2 system is shown that employs the same numerals to denote like parts of the FIG. 2 system. Those parts that are different include a double prime ("). The transmitter array 10" has a single transmitter 12" which is maneuvered along an appropriate guideway, or the like (not shown), by a motor 88 to each of the positions of the individual transmitters in the FIG. 2 embodiment. The motor 88 can be a stepping motor or any other type device that can be operated by the ring counter 38 or some similar device. If the ring counter 38 is used to step the motor 88, it can also be used to provide the sequential application of the different drive frequencies $f1$ through $fn$ to the transmitter 12'' in each of its respective positions. As in the FIG. 2 embodiment, when the ring counter 38 provides actuating signals sequentially to each transmitter drive channel 45, its AND gate 48 and AND gate 50, assuming there is a transmit command signal at the input of the AND gate 50, the transmitter 12'' will be driven at the frequency selected for that channel 45 and that position of the transmitter 12''. Consequently, the transmitter 12'' is moved successively from position to position and in each position driven at a different frequency so the same sets of imaging signals $f1$ through $fn$ are developed by the process control 24 and frequency compensated as in the FIG. 2 embodiment before being shown by the display device 26. Necessarily, the timing of the operation of the motor 88 and the driving of the transmitter 12'' are appropriately programmed to carry out these functions. The remainder of this FIG. 4 system is the same as the FIG. 2 system.

The FIG. 5 embodiment is similar to the FIG. 4 embodiment and correspondingly is a modification of the FIG. 2 system. Therefore, the same numerals as used in FIGS. 4 and 2 are utilized to denote like parts. In this FIG. 5 embodiment, a variable frequency oscillator 90 is employed instead of individual oscillators 46 to drive the transmitter 12'' at either a continuously increasing or continuously decreasing frequency as the motor 88 maneuvers the transmitter 12'' to each of its selected positions. Separate transmitter drive channels 45 are therefore not required but only the one denoted at 45''. This channel 45 requires only one AND gate 50'', which has one input connected to the variable frequency oscillator 90 and its other input connected so as to receive the transmit command signal from the timer 30. The ring counter 38 performs as in the FIG. 2 and 4 embodiments to operate the motor 88 and the processing control 24 except that the processing control 24 requires instead of AND gates 55 with two inputs, AND gates 55'' with three inputs. These AND gates 55'' have one input connected to the variable frequency oscillator 88, and the other two connected to the ring counter 38 and to the timing control 20 so as to respectively receive the actuating signals and the receive command signals.

In operation, the FIG. 5 transmitter 12'' is continuously driven by the variable frequency oscillator 88 during the transmit cycle but the receive cycle is only initiated in one of the selected positions of the transmitter 12'', these positions as before corresponding to each of the positions of the individual transmitters 12 in the FIG. 2 embodiment. The programming of movement and reception is such that, in say the $f2$ frequency position, the ring counter 38 will provide an actuating signal to the AND gate 55'' for the $f2$ frequency and assuming a receive command signal has also been provided, a $f2$ reference frequency signal will be provided to the processing channels 52. At this same instant the reflected $f2$ frequency acoustic energy will be detected and the processing will proceed as before to develop a set of imaging signals for the $f2$ frequency. This sequence of events continues to occur in each position with read-out and display being accomplished as described relative to the FIG. 2 embodiment.

As can now be appreciated, the various described embodiments all provide increased transmitter apertures. Also by employing different frequencies, the multiple object problem is overcome because the narrow band with the filters reject all frequency components except those desired.

What is claimed is:

1. A method of imaging objects comprising the steps of irradiating the object with coherent radiation at different selected frequencies and from a plurality of predetermined positions, receiving the radiation reflected from the object, processing the reflected radiation to obtain a set of imaging information signals for each of the selected frequencies, displaying the sets of imaging information to develop a hologram of the object and controlling the irradiating, the processing and the displaying steps so as to be in a certain timed relationship.

2. The method according to claim 1 and further including the step of reconstructing an image of the object from the hologram.

3. A method of imaging objects comprising the steps of irradiating the object with coherent radiation at different selected frequencies, the irradiating step including the step of driving an array of spaced apart transmitters each in a certain sequence and each at one of the different selected frequencies, receiving the radiation reflected from the object, processing the reflected radiation to obtain a set of imaging information signals for each of the selected frequencies, and displaying the sets of imaging information to develop a hologram of the objects.

4. A method of imaging objects comprising the steps of irradiating the object with coherent radiation at different selected frequencies, the irradiating step including the step of driving an array of spaced apart transmitters each simultaneously at a different one of the selected frequencies, receiving the radiation reflected from the object, processing the reflected radiation to obtain a set of imaging information signals for each of the selected frequencies, and displaying the sets of imaging information to develop a hologram of the object.

5. The method according to claim 1, wherein the irradiating step further includes the step of sequentially maneuvering a transmitter to different predetermined positions and in each position driving the transmitter at a different one of the selected frequencies.

6. The method according to claim 1, wherein the irradiating step further includes the step of sequentially maneuvering a transmitter to different predetermined positions and driving the transmitter at a continuously varying frequency.

7. A method of imaging objects comprising steps of irradiating the object with coherent radiation at different selected frequencies, receiving a radiation reflected from the object, processing the reflected radiation to obtain a set of imaging information signals for each of the selected frequencies, the processing step including the steps of phase comparing the received reflected radiation at each selected frequency with a corresponding reference frequency quantity to develop resultant quantities, filtering the resultant quantities to obtain the set of imaging information signals, storing the sets of imaging information signals and developing frequency compensation quantities for each selected frequency and displaying the sets of imaging information signals to develop a hologram of the object by utilizing the sets of imaging information signals and the frequency compensation quantities.

8. In a holographic system for providing a hologram of an object, the combination of means irradiating the object with coherent radiation at different selected frequencies and from a plurality of predetermined positions, means receiving the radiation reflected from the object and developing corresponding detected signals for each of these selected frequencies, means processing the detected signals to develop imaging information signals for each of the selected frequencies, and display means operative in response to the imaging information signals to develop a hologram of the object, and timing means operative to initiate the successive operation of the irradiating means, the processing means, and the display means in a certain timed relationship means utilizing the hologram to provide an image of the object.

9. In a holographic system for providing a hologram of an object, the combination of means irradiating the object with coherent radiation at different selected frequencies, the irradiating means including an array of spaced apart transmitters and means driving the transmitters each at a different selected frequency, means receiving the radiation reflected from the object and developing corresponding detected signals for each of these selected frequencies, means processing the detected signals to develop imaging information signals for each of the selected frequencies, display means operative in response to the imaging information signals to develop a hologram of the object, and means utilizing the hologram to provide an image of the object.

10. In a holographic system for providing a hologram of an object, the combination of means irradiating the object with coherent radiation at different selected frequencies, the irradiating means including an array of spaced apart transmitters and means driving each of the transmitters in a certain sequence and each at a different one of the selected frequencies, means receiving the irradiation reflected from the object and developing corresponding detected signals for each of the selected frequencies, means processing the detected signals to develop imaging information signals for each of the selected frequencies, display means operative in response to the imaging information signals to develop a hologram of the object, and means utilizing hologram to provide an image of the object.

11. In a holographic system for providing a hologram of an object, the combination of means irradiating the object with coherent radiation with different selected frequencies, the irradiating means including an array of spaced apart transmitters and means driving each of the transmitters simultaneously and each at a different one of the selected frequencies, means receiving the radiation reflected from the object and developing corresponding detected signals for each of these selected frequencies, means processing the detected signals to develop imaging information signals for each of the selected frequencies, display means operative in response to the imaging information signals to develop a hologram of the object, and means utilizing the hologram to provide an image of the object.

12. A holographic system as described in claim 8, wherein the irradiating means includes a transmitter, means sequentially maneuvering the transmitter to different predetermined positions, and means driving the transmitter at a different one of the selected frequencies in each position.

13. A holographic system as described in claim 8, wherein the irradiating means includes a transmitter, means sequentially maneuvering the transmitter to different predetermined positions, and means driving the transmitter at a continuously varying frequency.

14. In a holographic system for providing a hologram of an object, the combination of means irradiating the object with coherent radiation at different selected frequencies, the irradiating means including transmitter means and a reference frequency source operative to provide a plurality of outputs for driving the transmitter, each output being at a different one of the frequencies, means receiving the radiation reflected from the object and developing corresponding detected signals for each of the selected frequencies, means processing the detected signals to develop imaging information signals for each of the selected frequencies, the processing means including means phase comparing the detected signals at each selected frequency with the corresponding frequency output from the reference frequency source to develop resultant output signals at each selected frequency, means filtering the resultant output signals to develop the imaging information signals and frequency compensating means operative in response to the output from the reference frequency source to develop frequency compensating voltages for each frequency and display means operative in response to the imaging information signals to develop a hologram of the object, the display means also being responsive to the frequency compensating voltages so as to size compensate and correctly position the hologram for the different frequencies, and means utilizing the hologram to provide an image of the object.

15. A holographic system as described in claim 14 including means time controlling the system so the transmitter means, the processing means and the display means are operated in certain timed relationship.

16. A holographic system as described in claim 15, wherein the time controlling means also controls the reference frequency source so that the different frequency outputs therefrom are provided according to a certain scheme.

17. In a holographic system for providing a hologram of an object; the combination of transmitter means irradiating the object with acoustic energy; the transmitter means including a reference frequency source operative to provide a plurality of outputs for driving the transmitter means, each output being at a different selected frequency; means receiving and detecting the acoustic energy reflected from the object and developing corresponding sets of detected signals for each different selected frequency; means processing the sets of detected signals to develop corresponding sets of imaging information signals; the processing means including phase comparing means coupled to both the receiving means and the reference frequency source and operative to phase compare each set of detected signals with a corresponding frequency output from the reference frequency source and to develop a corresponding set of output signals for each frequency filtering and storing means operative to filter each set of output signals of undesired frequency components, so as to develop and store a set of imaging information signals for each frequency, and frequency compensating means operative in response to the plurality of outputs from the reference frequency source to develop and store frequency compensating voltages for each frequency; display means operative in response to the sets of imaging information signals to develop a portion of a hologram of the object for each set of imaging information signals; the display means including a display control means coupled to the frequency compensation means and operative to provide frequency compensated scanning for the display means for each set of imaging information signals so that each portion of the hologram is spatially located relative to the other and size proportioned to provide a complete hologram of the object; read out means operative to read out the sets of imaging information signals from the filtering and storing means and from the frequency compensation means; and timing means for time controlling the system; the timing means being operative to control the reference frequency source so that the different frequency outputs therefrom are provided according to a certain scheme and also being operative to initiate the successive operation of the transmitter means, the processing means and the read out means in a certain timed relationship.

18. A holographic system as described in claim 17, wherein the transmitter means further includes an array of spaced apart transmitters and the reference to frequency source is operative to provide one of the plurality of outputs to each transmitter so that each transmitter is driven at a different one of the selected frequencies, and the timing means is operative according to the certain scheme to provide the plurality of output, one for each transmitter and each at a different selected frequency in a predetermined timed sequence.

19. A holographic system according to claim 17, wherein the transmitter means includes an array of spaced apart transmitters and the reference frequency source is operative to provide one of the plurality of outputs to each transmitter, and the timing means is operative according to the certain scheme to provide the plurality of outputs simultaneously one output to each transmitter 20. A holographic system according to claim 17, wherein the transmitter means includes a transmitter and means maneuvering the transmitter to the different predetermined positions and the reference frequency source is operative to provide one of the plurality of outputs to the transmitter in each of the predetermined positions thereof.

21. A holographic system as described in claim 20, wherein the reference frequency source is operative to provide one of the plurality of outputs to the transmitter in each of the different predetermined positions thereof and the timing means is operative according to the certain scheme to provide the plurality of outputs to the transmitter in the different predetermined positions in a predetermined timed sequence.

22. A holographic system as described in claim 20, wherein the reference frequency source is operative to provide an output at a continuously varying frequency to the transmitter, and the timing means is operative to control the maneuvering means so that the transmitter is maneuvered to the predetermined positions in a predetermined timed sequence.

* * * * *